UNITED STATES PATENT OFFICE 2,389,718

DISUBSTITUTED DITHIOPHOSPHATES

Arnold R. Davis, Riverside, Conn., assignor to American Cyanamid Company, New York, N. Y., a corporation of Maine No Drawing. Application January 7, 1943,
Serial No. 471,606

5 Claims. (Cl. 260—461)

This invention relates to organic base salts of disubstituted dithiophosphoric acids and to methods of preparing the same.

I have found that many valuable products can be obtained having the following structural formula:

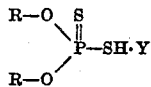

where R is alkyl, aryl or aralkyl, Y is selected from the group consisting of compounds having the following structural formula:

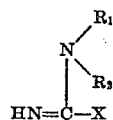

in which R₁ is hydrogen or the same as R₂, R₂ may be hydrogen, phenyl, thiazyl, or an aliphatic radical, X is

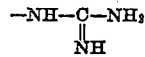

or

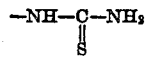

These salts are valuable organic compounds useful as flotation reagents and plasticizers, especially for polymerized chloroprene. The latter use is specifically described and claimed in my copending application Serial No. 471,605, filed January 7, 1943.

The following examples, in which parts are given by weight, illustrate some of the compounds falling within the scope of my invention, which is not restricted to the specific details set forth. Where formulas are given, R in each case represents the alkyl or aryl substituents of the di-thiophosphoric acid used.

EXAMPLE 1

*Guanyl thiourea dibutyl dithiophosphate*

2.36 parts of guanyl thiourea and 4.90 parts of dibutyl dithiophosphoric acid (98.7%) were mixed in a suitable reaction vessel. There was a small amount of heat evolved and a slightly greenish-white solid formed which melted below 100° C. The mixture was warmed on a steam bath, the crystals of unreacted guanyl thiourea were crushed, and the reaction completed. The final product was a white-colored waxy solid, melting below 100° C., and having the formula:

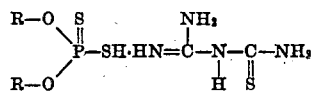

EXAMPLE 2

*Biguanide salt of dibutyl dithiophosphoric acid*

5.05 parts of biguanide and 24.5 parts of dibutyl dithiophosphoric acid (98.7%) were mixed in a suitable reaction vessel. There appeared to be no reaction until the mixture was warmed a little on a steam bath. Then, the reaction was fairly rapid with considerable heat evolved, requiring cooling in order to avoid undue rise in temperature. A light-colored viscous liquid resulted which solidified on standing for about 48 hours. The formula for this compound is believed to be:

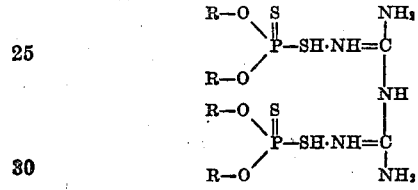

EXAMPLE 3

*Phenyl biguanide salt of dibutyl dithiophosphoric acid*

7.08 parts of phenyl biguanide and 9.8 parts of dibutyl dithiophosphoric acid (98.7%) were mixed in a suitable reaction vessel. Some heat was given off. After a short time on a hot plate, a reddish balsam was formed which was nearly solid at room temperature. It solidified on standing for about 48 hours. The formula for this compound is believed to be:

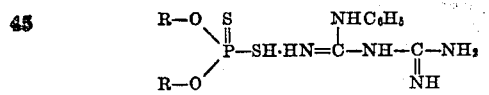

EXAMPLE 4

*Phenyl biguanide bis dibutyl dithiophosphate*

7.08 parts of phenyl biguanide and 19.6 parts of dibutyl dithiophosphoric acid (98.7%) were mixed in a suitable reaction vessel and heated on a steam bath for about three hours to get rid of lumps. The product which resulted may be represented by the formula:

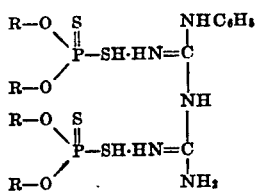

EXAMPLE 5

*Phenyl biguanide diamyl tetra thiophosphate*

15.1 parts of diamyl tetrathiophosphoric acid (made by reacting amyl mercaptan and $P_2S_5$) and 8.85 parts of phenyl biguanide were mixed in a suitable reaction vessel. Some heat was given off and the mixture became nearly solid. After heating for a short time on a steam bath at about 90° C., a light liquid separated. This was decanted and the remaining mix was washed with a little alcohol, then dissolved in acetone and made neutral to litmus by the addition of more phenyl biguanide. The neutral mixture was made slightly acid with more of the acid and finally neutral with more phenyl biguanide. The acetone was evaporated. A light-colored solid resulted, which may be represented by the formula:

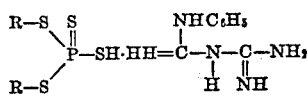

EXAMPLE 6

*Aniline-dicyandiamide-dibutyl dithiophosphoric acid reaction product*

9.3 parts of aniline and 26.6 parts of 91% dibutyl dithiophosphoric acid were mixed in a suitable reaction vessel. Heat was given off and after a short time, 8.4 parts of dicyandiamide were added. The whole mix was heated at about 95° C. for one hour. Some of the dicyandiamide disappeared. The mix was cooled overnight, then heated to 95° C. and held at that temperature for about one hour. It was then held at 80° C. for two to three hours. A thick light-colored balsam resulted which formed a light-colored waxy solid on standing. This is believed to be phenyl biguanide dibutyl dithiophosphate, which may be represented by the formula:

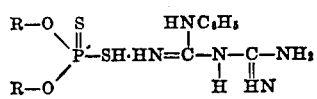

EXAMPLE 7

*Aniline-dicyandiamide-dibutyl dithiophosphoric acid reaction product*

9.3 parts of aniline were mixed with 8.4 parts of dicyandiamide (100-mesh) in a suitable reaction vessel and 26.6 parts of 91% dibutyl dithiophosphoric acid were added slowly with stirring. The temperature rose to about 70°–75° C. The mixture was then put on a steam bath and the temperature rose further to 90° C., but soon dropped to about 80° C. The mass was heated at 80° C. for 1½ hours. A straw-colored balsam was formed which appeared the same as that obtained in reaction of aniline dibutyl dithiophosphate and dicyandiamide in accordance with Example 6. On standing, the balsam formed a waxy solid like that produced in Example 6.

EXAMPLE 8

*Phenyl biguanide di-isopropyl dithiophosphate*

17.7 parts of 100-mesh phenyl biguanide were stirred slowly and with cooling into 21.1 parts of 97% di-isopropyl dithiophosphoric acid in a suitable reaction vessel. Then the mixture was heated for a short time on a steam bath. A soft greyish-colored resin was formed which became solid on standing at room temperature. This reaction product is the phenyl biguanide salt of the acid used and may be represented by the formula:

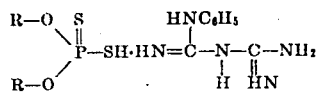

EXAMPLE 9

*Bis (cyanoethyl) amine dibutyl dithiophosphate-dicyandiamide reaction product*

6.15 parts of bis (cyanoethyl) amine were stirred into 13.3 parts of 91% dibutyl dithiophosphoric acid. 4.2 parts of dicyandiamide (100-mesh) were then added. The reaction mixture was heated on a steam bath for three hours. A brown-colored balsam was formed. This reaction product is believed to be a biguanide salt of the acid used and may be represented by the formula:

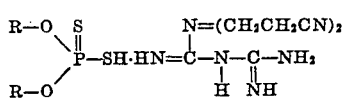

EXAMPLE 10

*Aminobenzothiazole dibutyl dithiophosphate-dicyandiamide reaction product*

7.5 parts of aminobenzothiazole were stirred into 13.3 parts of 91% dibutyl dithiophosphoric acid. Some heat was given off and a waxy solid melting below 100° C. was formed. 4.2 parts of dicyandiamide (100-mesh) were added and the mixture was heated to 95° C. on a hot plate and held between 90° and 95° C. for about one-half hour. Then, the mixture was heated on a steam bath at about 80°–90° C. for one and one-half hours. A clear brown-colored liquid was formed which became a soft waxy solid on standing at room temperature. This reaction product is believed to be a biguanide salt of the acid used and may be represented by the formula:

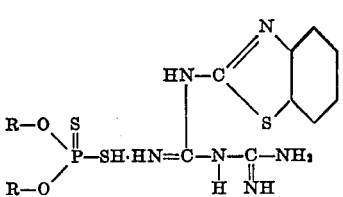

EXAMPLE 11

*Dilauryl dithiophosphoric acid-aniline-dicyandiamide reaction product*

8.4 parts dicyandiamide (100-mesh) and 9.3 parts of aniline were mixed in a suitable reaction vessel. 48.3 parts dilauryl dithiophosphoric acid were added with stirring. Some heat was given off. The mixture was heated on a steam bath at about 80° C. for approximately six hours. A light-colored viscous liquid was formed. This reaction product is believed to be the phenyl biguanide salt of the acid used and may be represented by the formula:

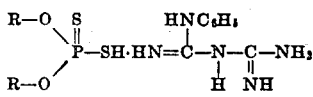

EXAMPLE 12

*Amyl alcohol-methyl hexanol dithiophosphoric acid-aniline-dicyandiamide reaction product*

8.4 parts of dicyandiamide and 9.3 parts of aniline were mixed in a suitable reaction vessel. 32.9 parts of amyl alcohol-methyl hexanol dithiophosphoric acid were stirred in. Some heat was given off. The mixture was heated on a steam bath at about 80° C. for approximately two hours. A thick brownish-colored liquid resulted. This reaction product is believed to be the phenyl biguanide salt of the acid used and may be represented by the formula:

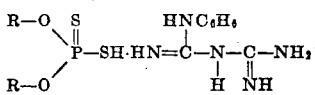

EXAMPLE 13

*Aniline-dicyandiamide-methyl hexanol dithiophosphoric acid reaction product*

16.8 parts of dicyandiamide (100-mesh freshly screened) were wet with 18.6 parts of aniline in a suitable reaction vessel. 70.4 parts of methyl hexanol dithiophosphoric acid (eq. wt. 352) were added slowly with stirring. The mixture was heated gradually to about 105° C. and held at about that temperature for three hours. The total time of heating was four hours. Under the microscope, this product appeared to be practically free of crystals of unreacted dicyandiamide. This reaction product, a brown viscous liquid, is believed to be the phenyl biguanide salt of the acid used and may be represented by the formula:

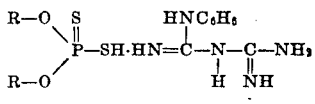

EXAMPLE 14

*Aniline-dicyandiamide-methyl hexanol dithiophosphoric acid reaction product*

294 parts of dicyandiamide (100-mesh freshly screened through a 60-mesh screen to eliminate agglomerates) were wet with 332 parts of aniline (2% excess). 1257 parts of methyl hexanol dithiophosphoric acid (eq. wt. 352) (2% excess) were added slowly with stirring. The mixture was heated gradually to 105° C. and was held at that approximate temperature for three hours. The total heating time was four hours. The loss in weight on heating was 20 parts; the yield was 99%. This product is essentially the same as described in Example 13 and has the same formula.

EXAMPLE 15

*Bis (cyanoethyl) amine-dicyandiamide-methyl hexanol dithiophosphoric acid reaction product*

16.8 parts of dicyandiamide (100-mesh freshly screened) were wet with 25.83 parts of bis (cyanoethyl) amine (5% excess) in a suitable reaction vessel. 73.92 parts of methyl hexanol dithiophosphoric acid (5% excess) were added slowly with stirring. The mixture was heated gradually to about 105° C. and held at that temperature, plus or minus a few degrees, for one hour. The total heating time was 2½ hours. The reaction was nearly complete after two hours' heating. The product was somewhat darker in color than the corresponding one made with aniline. The product is believed to be essentially a biguanide salt of the acid used and may be expressed by the formula:

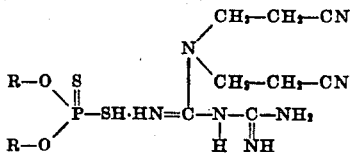

EXAMPLE 16

*Phenyl biguanide methyl hexanol dithiophosphate*

17.7 parts of 100-mesh phenyl biguanide and 35.2 parts of methyl hexanol dithiophosphoric acid (eq. wt. 352) were mixed in a suitable reaction vessel and heated on a steam bath at about 80° C. for 1½ to 2 hours and allowed to stand for about 48 hours. Then, the mixture was heated for one hour at about 85° C. and for two hours at about 70° C. A dark brown, viscous liquid resulted. The product is believed to be the phenyl biguanide salt of the acid used and may be represented by the formula:

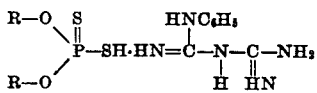

EXAMPLE 17

*Aniline-dicyandiamide-butyl ether of diethylene glycol dithiophosphoric acid reaction product*

16.8 parts of 100-mesh dicyandiamide freshly screened were wet with 18.97 parts of aniline (2% excess) and 86.29 parts of butyl ether of diethylene glycol dithiophosphoric acid (2% excess), in a suitable reaction vessel. The mixture was heated, with stirring, in 45 minutes to 104° C. and held between 100° and 104° C. for 50 minutes. A clear, brownish-colored balsam was formed, which is believed to be essentially the phenyl biguanide salt of the acid used and may be represented by the formula:

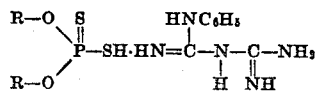

The term "methyl hexanol dithiophosphoric acid" as used herein means the di-alkyl dithiophosphoric acid obtainable by reacting methyl hexanol with $P_2S_5$.

Suitable other changes and variations may be made in carrying out the invention without departing from the spirit and scope thereof as defined in the appended claims.

I claim:

1. The process of preparing phenyl biguanide salts of dialkyl dithiophosphoric acids which comprises the steps of combining, in substantially molecular proportions, a dialkyl dithiophosphoric acid in which the alkyl groups contain from 4–12 carbon atoms, dicyandiamide and aniline, heating the mixture for a sufficient time to substantially complete the reaction and collecting the resultant salt.

2. The process of preparing phenyl biguanide salts of di(methylhexyl) dithiophosphoric acid which comprises the steps of admixing substantially molecular proportions of di(methylhexyl) dithiophosphoric acid, dicyandiamide and aniline, heating the mixture sufficiently to carry the reaction substantially to equilibrium and collecting the resultant salt.

3. An organic base salt of a dialkyl dithiophosphoric acid, said salt having the structural formula

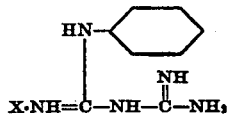

in which X is a dialkyl dithiophosphoric acid, the alkyl groups containing from 4–12 carbon atoms.

4. The di(methylhexyl) dithiophosphoric acid salt of phenyl biguanide.

5. The organic base salt of di(methylhexyl) dithiophosphoric acid obtained by reacting substantially equi-molecular proportions of aniline, dicyandiamide and di(methylhexyl) dithiophosphoric acid.

ARNOLD R. DAVIS.